Oct. 11, 1966
M. GERTEL
3,277,696
FLUID SUSPENSION OF LOADS
Filed Dec. 30, 1963
2 Sheets-Sheet 1
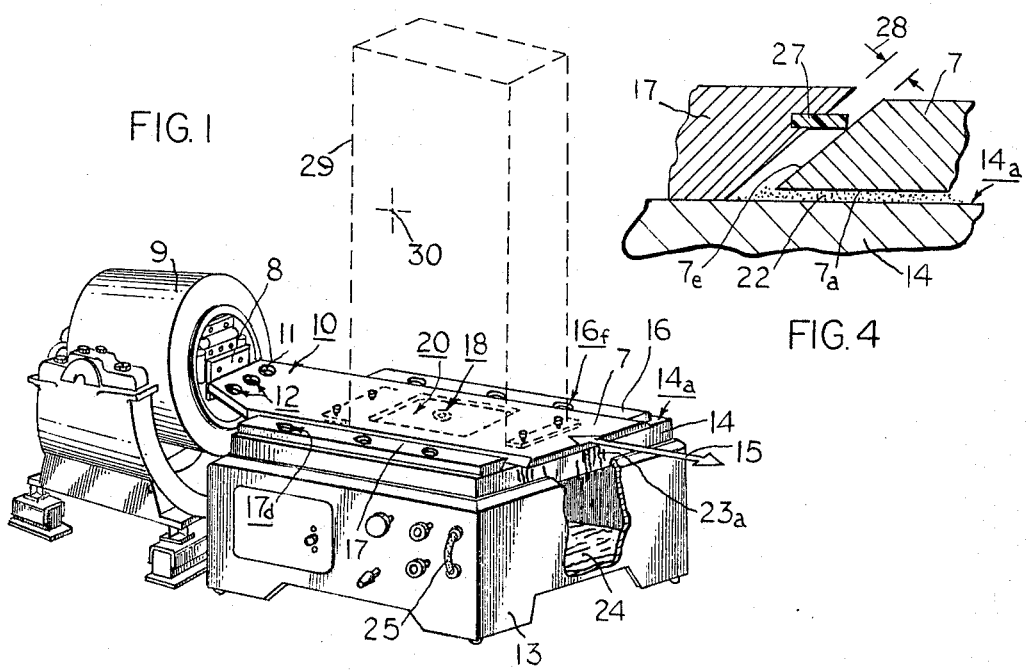
FIG. 1
FIG. 4
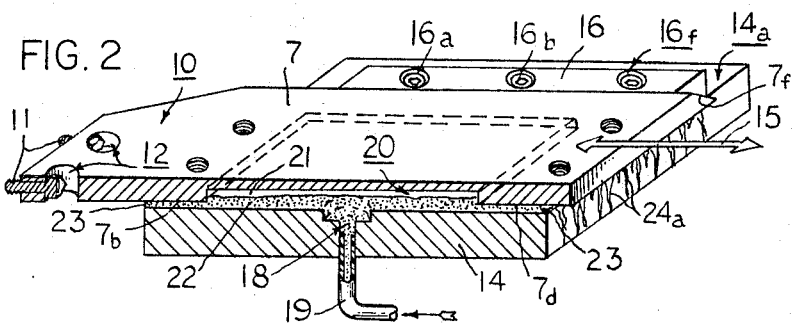
FIG. 2
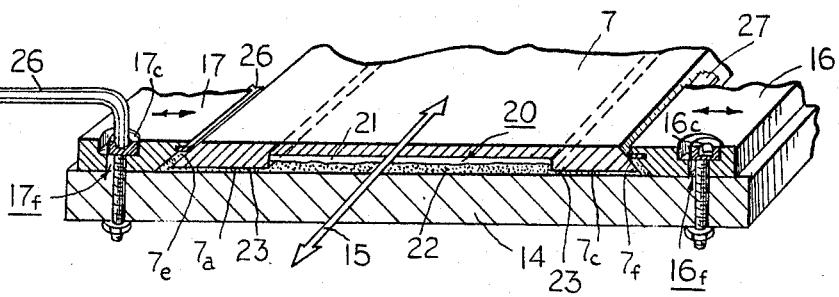
FIG. 3
INVENTOR.
MAURICE GERTEL
BY
Dike, Thompson, Bronstein, & Mrose
ATTORNEYS Oct. 11, 1966 M. GERTEL 3,277,696
FLUID SUSPENSION OF LOADS
Filed Dec. 30, 1963 2 Sheets-Sheet 2

INVENTOR.
MAURICE GERTEL
BY
Dike, Thompson, Bronstein, † Mrose
ATTORNEYS

United States Patent Office 3,277,696
Patented Oct. 11, 1966

3,277,696
FLUID SUSPENSION OF LOADS
Maurice Gertel, Brookline, Mass., assignor to Mitron Research & Development Corporation, Waltham, Mass., a corporation of Delaware
Filed Dec. 30, 1963, Ser. No. 334,474
9 Claims. (Cl. 73—71.6)

The present invention relates to improvements in the suspension of loads by fluid media and, in one particular aspect, to novel and improved high-efficiency vibration test tables having unique provisions for secure suspension of massive unbalanced loads subjected to high-frequency oscillations, and in which a combination of pressurized fluids acts to minimize energy losses in the suspension and to preserve optimum support over prolonged testing periods.

Thin films of fluid have been exploited in a number of ways for the support of loads, notably in so-called "fluid" bearings which commonly require a continuous supply of pressurized air or other gas to maintain a form of low-viscosity lubrication and to exert directionalized forces which counteract loading. Air-film suspensions offer very limited load-supporting capabilities, however, and it has been necessary to resort to broad-area liquid films when load bulk has been very large. One application for the latter type of suspension has been in the full-scale testing of large objects intended to withstand severe environmental vibration conditions, these objects being mounted on a base plate reciprocated rapidly and with high-amplitude sinusoidal excursions by a hydraulic or electrodynamic exciter. In such cases, a layer of oil or other suitable liquid interposed between the flat base plate and a planar mounting table functions to reduce frictional resistance to the desired movements and, at the same time, to maintain adhesive and cohesive forces tending to keep the mounting table and plate together. Thinner films offer the better cohesiveness needed to suppress lifting of a base plate from its mount, but at the expense of high shear losses and reduced efficiency of the testing system. Such lifting or "slapping" of the base plate is most likely to occur when the tested load exhibits a high center of gravity, and, in those instances where the center of gravity is also out of alignment with the center line of the forceful reciprocations, twisting or "cross-talk" is often troublesome as well. Unless the film thickness is essentially constant, the shear losses and hence, system efficiency vary also; ordinarily, however, the liquid film becomes progressively thinner during testing, as it is expelled by the squeezing reciprocating actions. These difficulties can result in damage to costly exciters, and can seriously reduce measurement accuracies.

Accordingly, it is one of the objects of the present invention to provide improvements in the suspension of loads, and, particularly, in the precise and secure attachment of a massive load to a fixed support for low-loss relative movements on fluid layers.

Another object is to provide a unique high-efficiency precision fluid bearing wherein a liquid film and gaseous layer coact to develop a strong and uniform coupling between relatively movable members.

A further object is to provide improved and low-loss apparatus of inexpensive construction for fluid-film support of loads wherein substantial lifting forces are developed by a continuously-pressurized gaseous medium and wherein sealing and adhesion characteristics between relatively movable members are developed by a liquid film.

An additional object is to provide load-suspension equipment wherein relatively movable members oriented by simple guides are both lubricated and secured together by continuously-pressurized gas and liquid layers of controlled thickness which preserve low losses and predetermined operating characteristics over prolonged periods.

Still further it is an object to provide improved vibration tables in which a load-supporting plate adapted for reciprocation by an exciter is guided by adjustable rails which also serve to limit the thickness of a pressurized liquid lubricating film to a predetermined value around a confined large-area air layer.

By way of a summary account of practice of this invention in one of its aspects, a massive horizontal mounting slab having a substantially planar upper surface is provided with an essentially centralized opening through which an oil with entrapped air bubbles is forced from below. Atop the mounting slab is disposed a slidable substantially rectangular load-supporting plate, the lower surface of which is centrally recessed upwardly to form a shallow closed large-area cavity fully surrounded by relatively wide and substantially planar marginal areas. At one narrower end, the slidable plate is adapted to be coupled with the armature of a separate electro-dynamic vibration exciter, for sinusoidal reciprocating movements of controlled amplitude and frequency. Along its edges aligned with the direction of reciprocating movement the slidable plate is dovetailed with a pair of lateral guides which are adjustable in relation to the mounting slab to permit accurate alignment of the plate with the armature of the exciter and which permit the plate to be spaced slightly from the mounting slab, in the vertical direction. Continuous pressurization of the supply of oil and air causes a layer of air to appear atop a layer of oil within the plate cavity, and the oil is gradually and continuously spread laterally outwardly between the mounting slab and marginal areas of the plate to form a substantially continuous film, interrupted only at localized spots by minute quantities of expelled air. Cohesive and adhesive effects at the marginal areas, as well as the constraints of the guides, cause the reciprocated plate to remain securely positioned on the mounting slab even when an attached load is not symmetrically distributed, and the air layer provides both a desired lift and low substantially constant shear losses in the course of prolonged vibration testing operations.

Although the aspects of this invention which are believed to be novel are set forth in the appended claims, additional details as to preferred practices and as to the further objects, advantages and features thereof may be most readily comprehended through reference to the following description taken in connection with the accompanying drawings, wherein:

FIGURE 1 is a pictorial representation of an improved vibration test table in which teachings of the present invention are exploited, together with a typical vibration exciter, the vibration table being partially broken away to expose its interior, and a typical load configuration being suggested by dashed linework;

FIGURE 2 provides a longitudinally cross-sectioned illustration of cooperating mounting and load-supporting plate members of apparatus such as that portrayed in FIGURE 1;

FIGURE 3 provides a transversely cross-sectioned illustration of the members illustrated in FIGURE 2;

FIGURE 4 is an enlarged cross-sectioned detail of an adjustable guide cooperating with relatively movable slide plate and mounting members;

Figure 5:
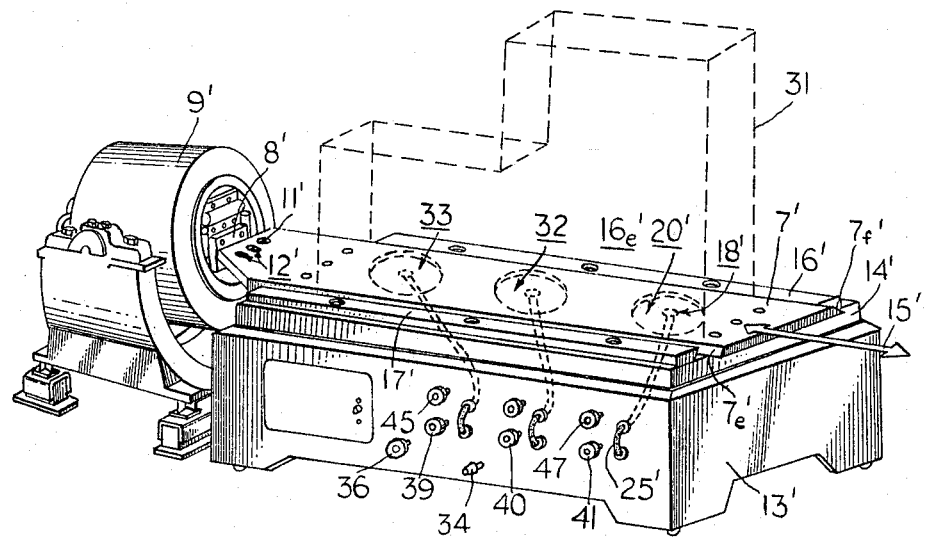
FIGURE 5 depicts an alternative multiple cavity construction for an improved vibration test table, together with the dashed outline of a load under evaluation.

The horizontal vibration test table apparatus illustrated in FIGURE 1 includes a generally rectangular metal mounting plate 7 which is to be reciprocated in essentially sinusoidal manner by the movable armature 8 of a known form of electrodynamic "shaker" or vibrator 9 to which it is coupled at one of its narrower ends, 10, by bolts 11 extending therethrough and accessible through openings 12. Stand 13 carries a horizontal mounting plate or slab 14 at the top, this being a sturdy member of granite, cast iron, or the like, which is capable of withstanding high loadings and which can be conveniently manufactured with a substantially planar and preferably precision-finished upper surface 14a. The reciprocated plate 7 is superposed on the somewhat wider mounting slab and is slidable back and forth horizontally in the directions of arrow 15 as the exciter operates. Lateral guides 16 and 17, attached to the mounting slab, serve to orient the slidable plate for the intended reciprocating movements in precise alignment with the directions of exciter armature vibrations.

At a generally centralized position, the mounting slab 14 exhibits a through opening 18 to the bottom of which is connected a supply tube 19 (FIGURE 2) leading from a source of oil with small entrained air bubbles. The bottom of overlying slidable plate 7 is upwardly recessed at the site of the slab opening 18, and over a relatively large area surrounding the locus of that opening, to form a closed shallow cavity 20 in which the entrained air (or other gas) released from the oil tends to collect in a layer 21 above a layer 22 of the oil. The lateral expanse of cavity 20 is restricted by the need for relatively wide marginal lower surface areas 7a–7d of the slidable plate, in surrounding relationship to it. Marginal lower surface areas 7a–7d are formed in the same plane and are substantially parallel with the adjacent substantially planar surface 14a of the mounting slab. The liquid which entrains the air and forms a film 23 (FIGURES 2 and 3) between oppositely-disposed surfaces of the mounting slab and marginal areas of the slidable plate may be ordinary automotive lubricating oil, such as a non-detergent S.A.E. 20, 30 or 40 grade oil, for example. A pool 24 of the liquid collects within the enclosed stand 13 as the result of overflow due to gradual expulsion 23a from between the relatively movable plates, and this may either be discarded or recirculated, preferably after filtration. Substantially continuous pressurization of the fluids is important for purposes of developing bearing-type actions in the fluid layers 21 and 22, and preventing excessive thinning of the liquid film 23 as reciprocations act to expel small amounts of the liquid. A suitable pressurized supply (not visible in the illustration) is mounted within the enclosed stand 13; preferably, this includes a closed container of the oil which is pressurized by air (example: 10–15 p.s.i. pressure) to force the oil through a conduit into which the air is also injected to form a desired entrainment. The mixed fluids are passed through a transparent sight tube 25 on the control panel of the vibration test table, before being delivered to tube 19 and cavity 20, to provide a convenient bubble-flow indication that the fluids are being mixed and continuously delivered. A substantially continuous supply insures that the desired air and liquid layers are properly maintained despite the aforementioned overflow, whereas a depletion of film 23 in particular poses the dangers of excessively high frictions, overloading of costly exciters, and faulty vibration measurement conditions.

The lateral edges 7e and 7f of slidable plate 7 are tapered outwardly, from top to bottom, to form dovetail structure which facilitates its lateral entrapment by elongated guides 16 and 17 which are of complementary taper at the adjoining sites. Lateral guides 16 and 17 are of high-strength construction and are each secured directly to the mounting slab, or to some other sturdy portion of the test table, by a plurality of socket-head bolts 16a–16c and 17a–17c which are loosely fitted in enlarged openings 16d–16f and 17e–17f in the guides so that the latter may easily be adjusted laterally before the bolts are tightened by a suitable tool such as the wrench 26 (FIGURE 3). Adjustability afforded by this construction enables a test plate to be accurately aligned with an exciter armature by "cornering" without involving strenuous efforts to adjust the positions of the massive exciter or test table. Frictional resistance is minimized and held substantially constant by the introduction of auxiliary guide strips 26 and 27 which are set into the guides 16 and 17, respectively, and which engage the truncated edges 7e and 7f of plate 7 in essentially knife-edge fashion to reduce contact area to substantially a line in each case. As shown in the FIGURE 4 detail, insert guide 27 is preferably rectangular in cross-section, and is disposed substantially horizontal, for these purposes. The guides protrude sufficiently to preserve a small spacing, 28, between the oppositely-disposed dovetailed guide and plate edges, while at the same time this spacing is small enough to prevent the slidable plate to become separated from the guides and mounting slab even under the most rigorous test conditions likely to be experienced if the insert guides should become ineffective. The apparatus is thus of a fail-safe type, and large unbalanced loads, such as that designated by dashed line-work 29 in FIGURE 1 with its center of gravity 30 located non-symmetrically, can be accommodated without undue risk that the reciprocated plate 7 will become stripped from the fluid film and be free to move erratically. Insert guides 26 and 27 are made of a wear-and deformation-resistant material which minimizes friction, such as a polytetrafluoroethylene like Teflon.

As shown in FIGURES 2 and 3, the slidable load-mounting plate 7 is supported by the large-area air layer 20 in the central cavity, and by the marginal liquid film 23. Within the cavity itself, the liquid layer is preferably thicker than elsewhere, thus insuring that there is an excess of liquid under pressure which will continuously replenish the liquid lost by gradual lateral expulsion and overflow. Too light a liquid viscosity permits excessive leakage of both liquid and gas, but the viscosity should not be so high as to incur needlessly large losses due to shearing as the plate is reciprocated. Gas-bearing effects are promoted by the sealing produced by the liquid film 23; in addition this liquid film has cohesiveness and adhesiveness which act to hold the plate 7 on slab 14. Build-up of gas layer 20 is limited by the escape of small volumes of gas along with the liquid film 23; the liquid volume exceeds that of the air, and a desired equilibrium operating condition is realized as minute amounts of the gas spread laterally outwardly without actually opening a full gas-escape path through the marginal film 23. The latter film is thus not necessarily continuous at all positions, but it is nevertheless essentially so insofar as the sealing and film-bearing phenomena are concerned. In alternative constructions, the gas and liquid may be separately fed into the central cavity, rather than being advantageously intermixed, and, the cavity may also be formed in whole or part by a recess or well extending downwardly from the top surface of the mounting member 14.

Figure 6:
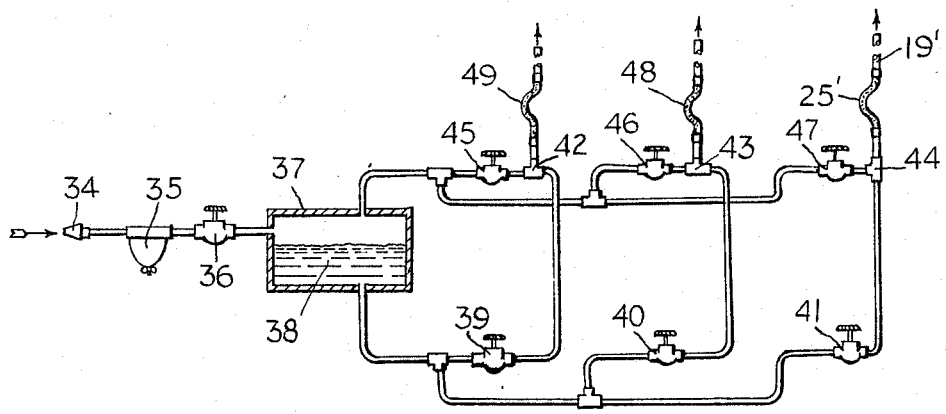
FIGURE 6 is a fluid supply network suitable for use with the apparatus of FIGURE 5.

Metal plate 7 may carry very substantial loads and may itself be of a massive construction, involving, for example, an overall length of about 6½ feet, an overall width of about 3¾ feet, an overall thickness of about 1½ inches, and a total weight of about 281 pounds. The film and guide constraints effectively suppress lift-off when relatively tall and unbalanced load specimens react by developing high overturning tendencies, particularly at or near resonance. However, in other instances, particularly where the specimens to be tested are much larger, it can be advantageous to exploit a plurality of gas-support cavities, rather than a single one. A construction of this type is viewed in FIGURE 5; the arrangement is generally like that of the FIGURE 1 apparatus, and therefore, for convenience, elements which serve the same function are identified by the same reference characters used in FIGURE 1, with distinguishing single-prime accents added. The reciprocated platform 7' is designed to accommodate an elongated load, 31, and the introduction of three spaced circular cavities, 20', 32 and 33, permits relatively large-area air-bearing support while at the same time preserving sufficient and well-distributed liquid-film regions to suppress lift-off tendencies, especially when the load reciprocations are at or near resonance. Air and oil supplies, and the associated tubing and valving provisions, are diagrammed in FIGURE 6; these insure that the effects and mode of operation described in connection with the FIGURE 1 equipment will be developed in the multi-cavity version. Coupling 34 admits pressurized air from a laboratory or shop conduit through a filter 35 and valve 36 into a closed container 37 which holds a reservoir 38 of oil, and the latter is thereby pressurized to flow through valves 39–41 into air-injection connections 42–44, respectively. The same air supply feeds the connections 42–44 through valves 45–47, respectively, and causes small bubbles to be entrained in the pressurized oil streams; the entrainments and flows can be observed, as an aid to manual regulation of the air-oil valving, through reference to the sight tubes 25', 48 and 49 which lead to the cavities 20', 32 and 33, respectively. The different cavities may also be differently pressurized and supplied with the immiscible fluids, depending upon variations in localized loadings which are taken into account by the operator. Temporary interruption of the pressurizations is permissible because the oil film which spreads between adjacent surfaces of the slidable plate and mounting slab suffices to maintain acceptable support until the film is dissipated.

Bearing arrangements which exploit these teachings need not be restricted to use in reciprocating systems, nor to those in which relative motion occurs in an essentially horizontal plane. It will also be apparent that the cavity configurations and distributions may be varied, and that the complementary surfaces between which the improved bearing support is provided need not be planar in some cases. Immiscible fluids, other than oil and air, may be used for like purposes, provided one will function to seal the other which is used for its low viscosity and low-loss characteristics. Accordingly, it should be understood that the specific embodiments herein disclosed are intended to be of a descriptive rather than a limiting character, and various modifications, combinations and substitutions may be effected in practice of these teachings without departure either in spirit or scope from this invention in its broader aspects.

What I claim as new and desire to secure by Letters Patent of the United States is:

1. Fluid suspension apparatus comprising a pair of relatively movable members having substantially horizontal surfaces of complementary shape which form a bearing site for relative movement therebetween, at least one of said members having at least one relatively shallow cavity recessed therein and open along one relatively large-area side thereof in position for exposure to the other of said members and marginally surrounded by surfaces more closely adjacent to complementary surfaces of the other of said members, fluid supply means forcing both gaseous fluid and liquid into said cavity under pressure, said liquid being a relatively viscous lubricant which tends to adhere to and forms a thin lubricating and sealing film between said closely-adjacent surfaces surrounding said cavity, said supply means forcing more of said liquid than gas into said cavity, and low-friction guide means limiting the separation between said closely-adjacent surfaces to an amount equal to a predetermined thickness of said film and permitting said relative movement between said members with low frictional losses.

2. Fluid suspension apparatus as set forth in claim 1 wherein said closely-adjacent surfaces are substantially planar, wherein said cavity is recessed into the upper one of said members, and wherein said gaseous fluid comprises air.

3. Fluid suspension apparatus as set forth in claim 1 wherein said fluid supply means includes means entraining said gas within a stream of said liquid in the form of small bubbles and forcing the resulting liquid-gas stream into said cavity.

4. Fluid suspension apparatus for the support of loads under tests involving motion, comprising a stationary mounting member having relatively large-area bearing surfaces on one side thereof, a movable load-supporting member having relatively large-area bearing surfaces closely adjacent to and of shape complementary to said bearing surfaces of said mounting member, means for connecting said load-supporting member to an exciter for reciprocating movements in relation to said mounting member, fluid supply means continuously forcing fluid material into the spaces between said bearing surfaces of said stationary and movable members, said fluid material including at least a relatively viscous liquid lubricant which tends to adhere to and form a thin lubricating and sealing film between said closely-adjacent surfaces, and stationary low-friction guide means fixed with said mounting member limiting the separation between said closely-adjacent surfaces to an amount equal to a predetermined thickness of said film and guiding movement of said load-supporting member on said mounting member, said stationary guide means including two elongated guide members each independently adjustable in relation to said mounting member for alignment with the directions of said movements to guide movements of said load-supporting member while preventing its separation from said mounting member while preventing its separation from said mounting member, and means for locking each of said guide members in relation to said mounting member.

5. Fluid suspension apparatus as set forth in claim 4 for support of loads undergoing vibration tests, wherein said load-supporting member has substantially parallel horizontal side edges intended for alignment with the directions of said movements, each of said edges being tapered outwardly from top to bottom, and wherein said guide members are disposed alongside said edges and are of complementary tapering adjacent to said tapered edges, the tapered surfaces of said guide members and edges being closely spaced to form loose dovetailing which prevents vertical separation between said members, bearing strips, one of said edges and guide members being faced with said bearing strips to suppress lateral movement between said spaced tapered surfaces and to reduce sliding friction therebetween.

6. Fluid suspension apparatus as set forth in claim 5 wherein said bearing strips are set into and fixed with said guide members and are each of cross-sectional configuration presenting a substantially knife-edge surface for contact with the adjacent tapering edge of said slidable member.

7. Fluid suspension apparatus as set forth in claim 4 wherein said bearing surfaces of said stationary and movable members are planar and substantially horizontal, wherein at least one of said members has at least one relatively shallow closed cavity recessed from the bearing surfaces thereof and exposed along a relatively large-area side thereof to the adjacent surfaces of the other of said members and marginally surrounded by surfaces more closely adjacent to the complementary surfaces of the other of said members, and wherein said fluid supply means comprises a reservoir of oil, a pressurized supply of air, means forming a continuously pressurized stream of oil from said reservoir, means introducing pressurized air from said supply into said stream to form an entrainment of air bubbles therein, and conduit means conveying the stream of oil with entrained air into said cavity.

8. Fluid suspension apparatus as set forth in claim 7 wherein said conduit includes a transparent sight tube permitting visual observation of the flow of said stream and entrainment of said air bubbles.

9. Fluid suspension apparatus as set forth in claim 8 further comprising valve means for controlling the flow of the oil from said reservoir, and valve means for controlling the flow of pressurized air from said supply into said stream, whereby the ratio of oil to air in said stream with entrained air may be regulated.

References Cited by the Examiner

UNITED STATES PATENTS

| | | | |
|---|---|---|---|
| Re. 24,816 | 4/1960 | Woods | 73—71.6 |
| 2,521,030 | 9/1950 | Wilson. | |
| 2,869,933 | 1/1959 | Bissinger | 308—5 |
| 3,208,270 | 9/1965 | Hill | 73—71.6 |

RICHARD C. QUEISSER, *Primary Examiner.*

JAMES J. GILL, *Examiner.*